United States Patent [19]

Bowen

[11] 4,045,876
[45] Sept. 6, 1977

[54] LIQUID LEVEL INDICATOR AND FLOW MEASURING DEVICE

[75] Inventor: James H. Bowen, Des Moines, Iowa

[73] Assignee: W. G. Jaques Company, Des Moines, Iowa

[21] Appl. No.: 593,889

[22] Filed: July 7, 1975

[51] Int. Cl.² .............................................. G01B 5/18
[52] U.S. Cl. .................................................. 33/126.6
[58] Field of Search ...................................... 33/126.6

[56] References Cited

U.S. PATENT DOCUMENTS

| | | | |
|---|---|---|---|
| 2,906,026 | 9/1959 | Hanes | 33/126.6 X |
| 3,140,609 | 7/1964 | Mayes | 33/126.6 X |
| 3,169,400 | 2/1965 | Kiramidjian | 33/126.6 X |
| 3,781,624 | 12/1973 | Tullis | 33/126.6 X |

FOREIGN PATENT DOCUMENTS 880,978   10/1961   United Kingdom ............... 33/126.6

Primary Examiner—William D. Martin, Jr.
Attorney, Agent, or Firm—Zarley, McKee, Thomte & Voorhees

[57] ABSTRACT

A liquid level indicator and flow measuring device comprising a portable housing adapted to be removably mounted in a man-hole and which has a liquid level sensing probe extending downwardly therefrom. The probe is periodically lowered, by the control means within the housing, until electrical contact with the liquid is achieved. The probe is then automatically raised a few inches above the liquid level for a predetermined length of time after which the probe is again lowered until the liquid level is electrically contacted. The movements of the probe are recorded on a clock device recording graph. Means is provided for switching the control apparatus to accommodate pipes having 0 to 12 inch diameters and 0 to 24 inch diameters.

13 Claims, 12 Drawing Figures

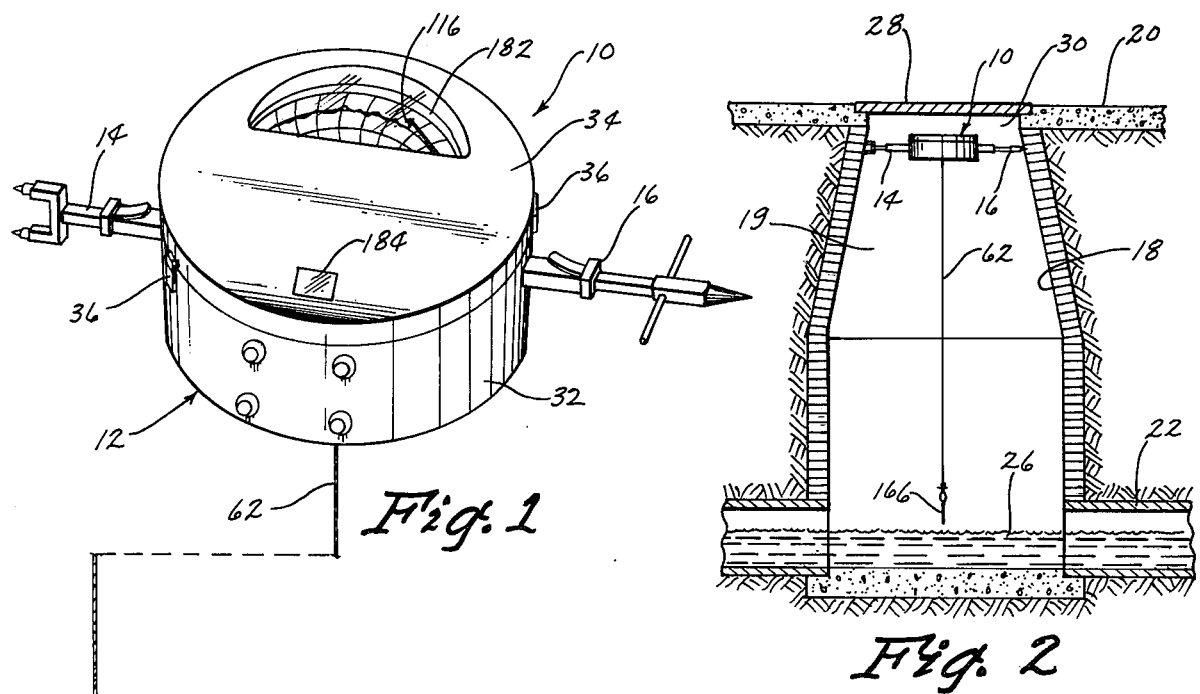
Fig. 1
Fig. 2
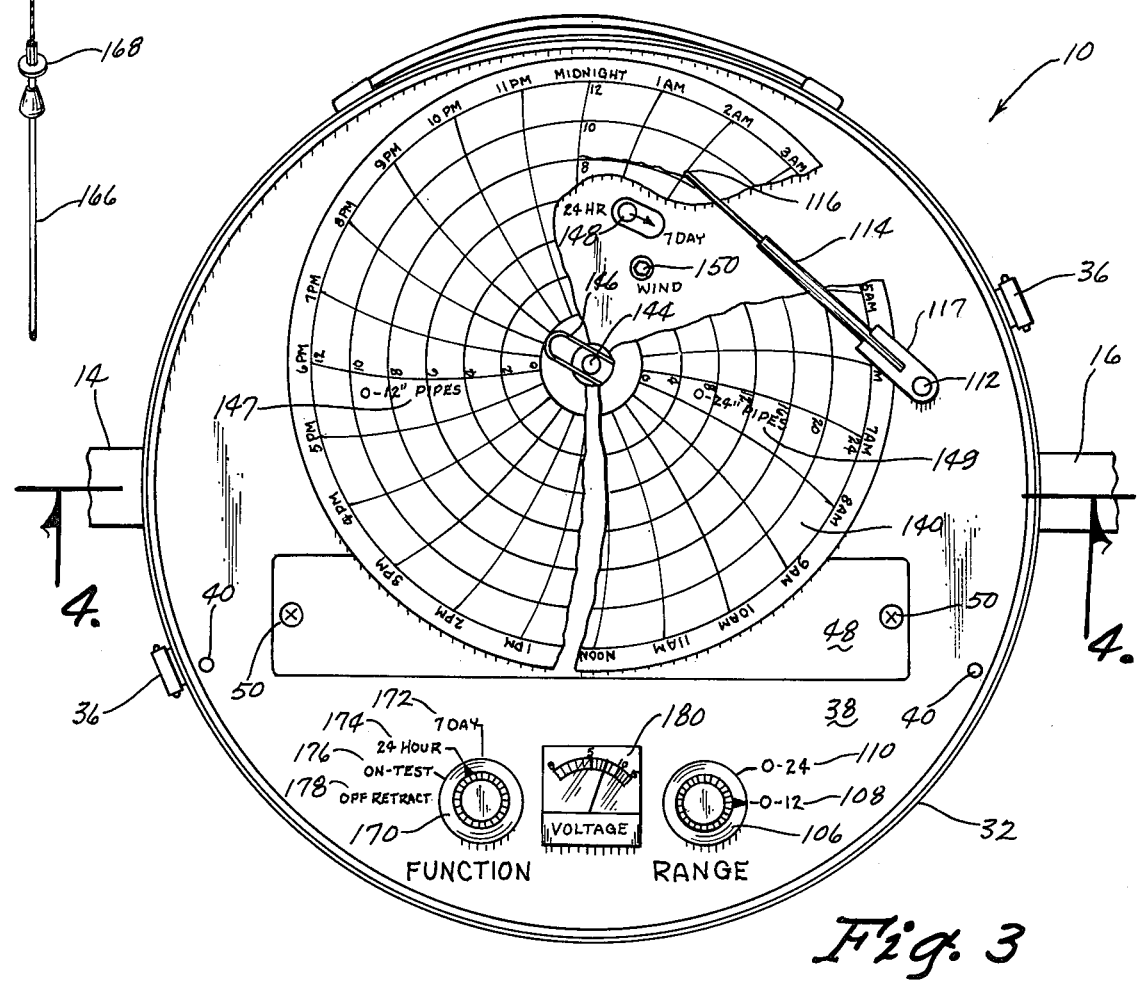
Fig. 3

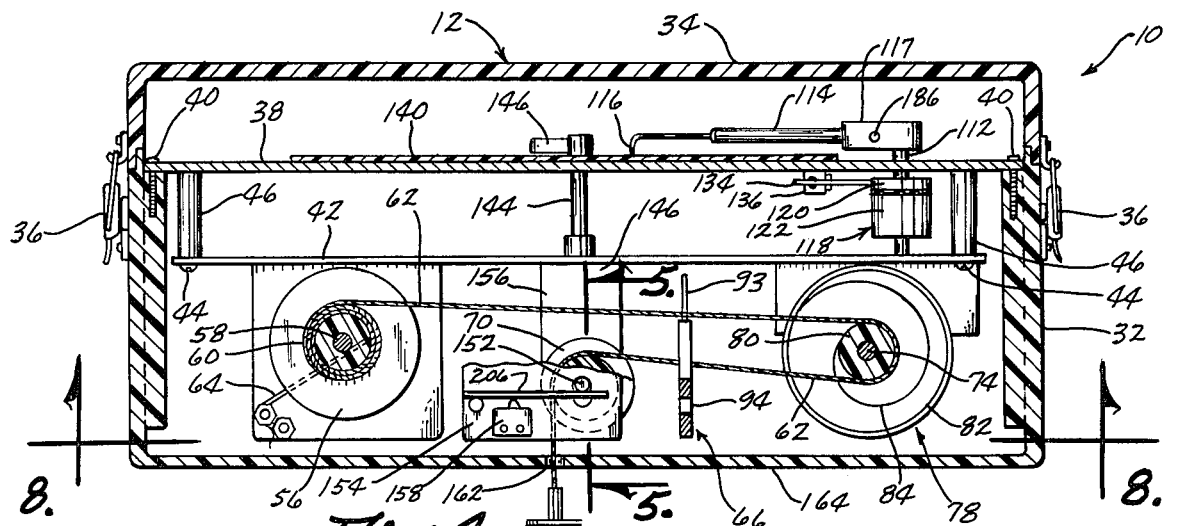
Fig. 4
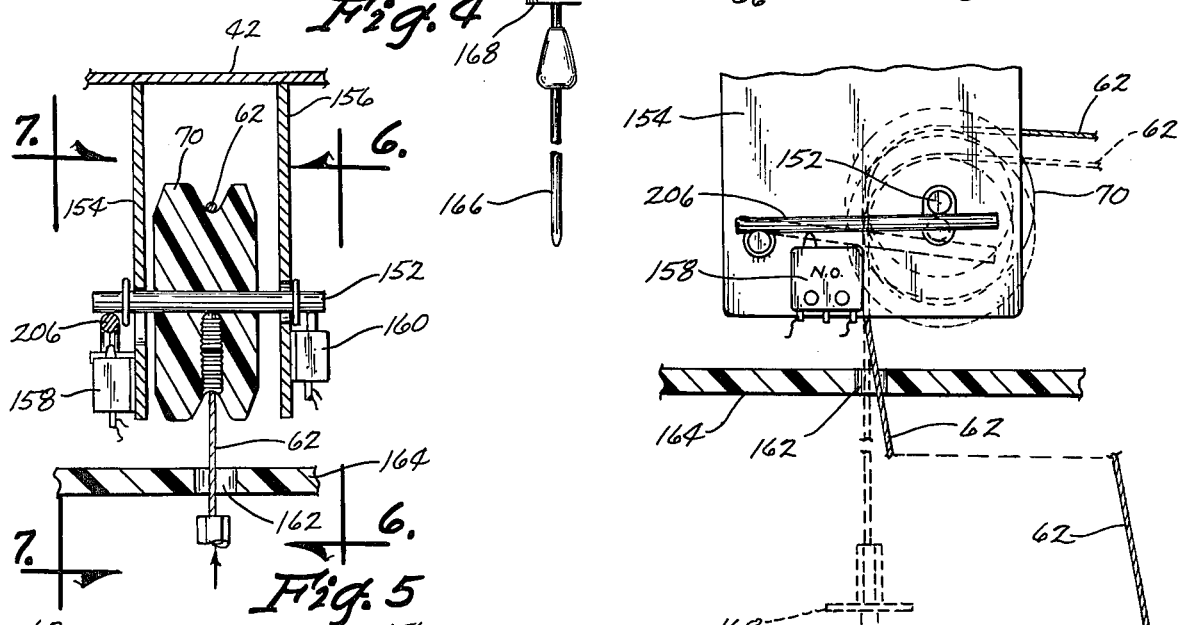
Fig. 5
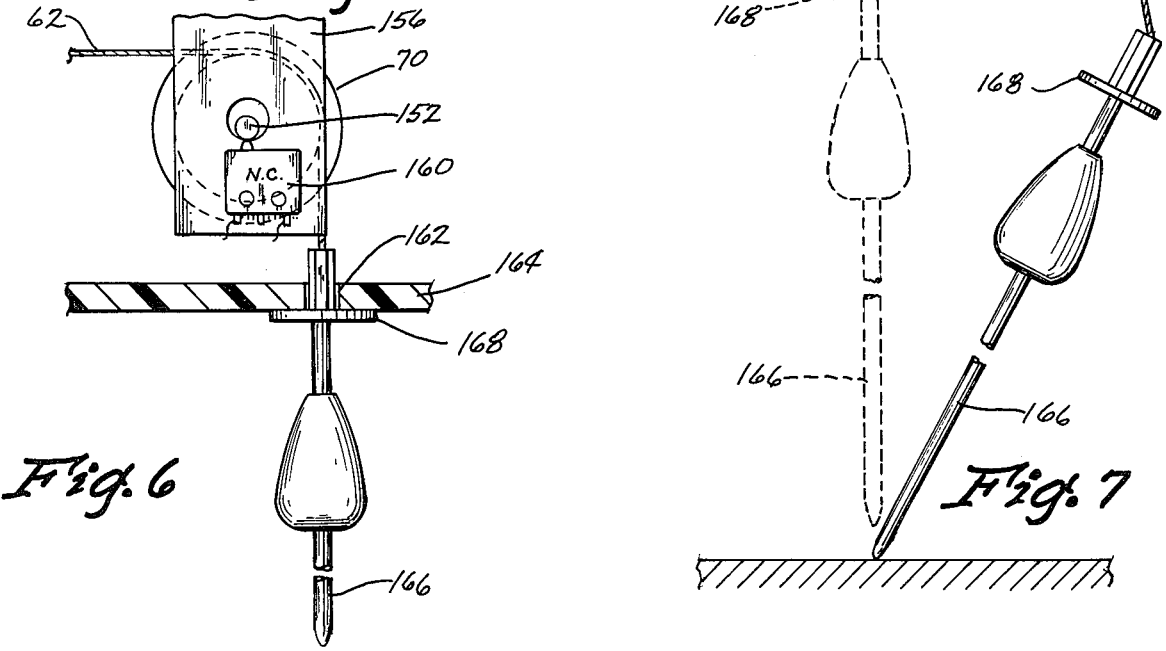
Fig. 6
Fig. 7

LIQUID LEVEL INDICATOR AND FLOW MEASURING DEVICE

BACKGROUND OF THE INVENTION

This invention relates to a liquid level indicator and flow measuring device and more particularly to a liquid level indicator and flow measuring device which may be removably mounted in a man-hole so as to record the level and flow of the liquid in a sewer pipe or the like.

Many prior art devices have been previously provided for measuring the liquid level in storage containers such as in the petroleum industry. The prior art devices are not well suited for use in ascertaining the liquid level and flow characteristics of liquid in a sewer pipe or the like since the liquid level in the sewer pipe may change rapidly within a short period of time and will undoubtedly change over a prolonged length of time.

A liquid level measuring apparatus of some relevance is U.S. Pat. No. 3,473,380 but the probe thereon remains closely adjacent the liquid being sensed after contact with the liquid has been achieved. The liquid flowing through a sewer frequently has debris floating thereon and the debris would be quite harmful to a sensing probe. Further, ripples in the flowing liquid would also adversely affect the accuracy of the probe, which remains in close proximity with the liquid, by striking the probe and causing the probe to swing.

Therefore, it is a principal object of the invention to provide an improved liquid level indicator and flow measuring device.

A further object of the invention is to provide a liquid level indicator and flow measuring device wherein the liquid sensing probe is automatically raised sufficiently upwardly above the liquid after sensing the same to avoid damage to the probe and to achieve more accurate recordings.

A further object of the invention is to provide a liquid level indicator and flow measuring device having an improved means for deactivating the control mechanism when the probe line is fully retracted.

A further object of the invention is to provide a single liquid level indicator and flow measuring device which may be adapted for use with sewer pipes or the like having 0 to 12 inch diameters and 0 to 24 inch diameters.

A further object of the invention is to provide a liquid level indicator and flow measuring device having three sample cycle rates.

A further object of the invention is to provide a liquid level indicator and flow measuring device having a transparent lid to permit monitoring of the operation of the device and of the recording chart.

A still further object of the invention is to provide a liquid level indicator and flow measuring device which is substantially maintenance free and durable in use.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

FIG. 1 is a top perspective view of the device of this invention:

FIG. 2 is a side view illustrating the device mounted in a man-hole:

FIG. 3 is a top view of the device with the cover removed therefrom and with portions of the recording chart broken away to more fully illustrate the invention:

FIG. 4 is a sectional view seen on lines 4—4 of FIG. 3 with portions thereof broken away to more fully illustrate the invention:

FIG. 5 is an enlarged sectional view seen on lines 5—5 of FIG. 4:

FIG. 6 is a sectional view seen on lines 6—6 of FIG. 5:

FIG. 7 is a sectional view seen on lines 7—7 of FIG. 5:

DESCRIPTION OF THE PREFERRED EMBODIMENT

Figure 8:
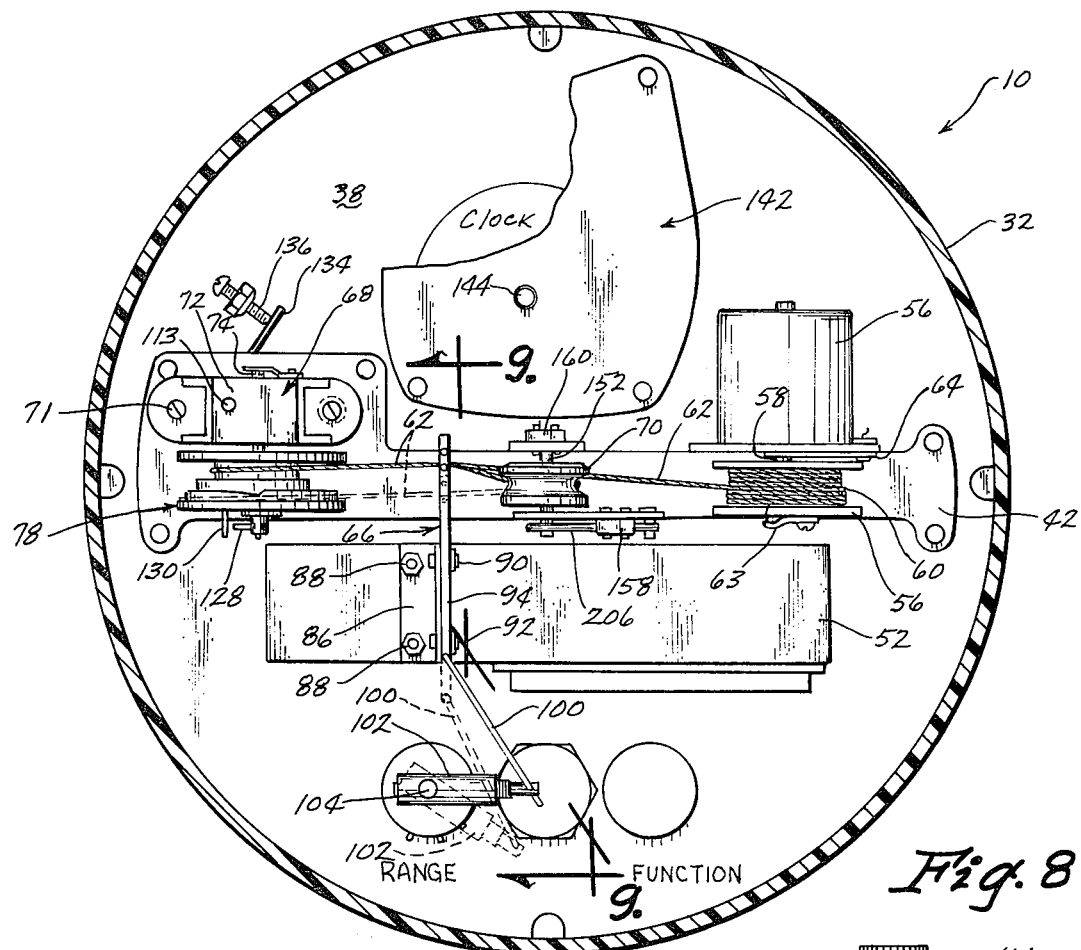
FIG. 8 is a sectional view seen on lines 8—8 of FIG. 4.

The device of this invention is referred to by the reference numeral 10 and generally comprises a housing 12 having length adjustable supports 14 and 16 extending laterally therefrom for engagement with the walls 18 of a man-hole extending downwardly from the surface 20 to a sewer pipe or line 22 having a liquid flowing therethrough. The level of the liquid in the pipe 22 is referred to generally by the reference numeral 26. Cover 28 extends over the opening 30 at the upper end of the man-hole 19.

Housing 12 comprises a lower housing member 32 having a transparent cover or lid 34 detachably secured thereto by connectors 36. Top plate 38 is secured to housing member 32 by screws 40. Support 42 is positioned below plate 38 by means of screws 44 and collars 46 as illustrated in FIG. 4. Plate 38 is provided with a removable cover 48 secured thereto by screws 50 which extends over a battery housing 52 positioned therebelow and adapted to support a re-chargable battery 54 therein.

Battery 54 is electrically connected to a reversible electric motor 56 (FIG. 12) secured to support 42 as illustrated in FIGS. 4 and 8 and having a power shaft 58 extending therefrom. An electrical conductive drum 60 is mounted on shaft 58 for rotation therewith and has a probe line 62 secured thereto and wound thereon. The end of probe line 62 is electrically connected to a terminal 63 by any convenient means. Spring 64 electrically engages shaft 58 as seen in FIG. 4 to "pick-off" the signal from the probe.

Figure 10:
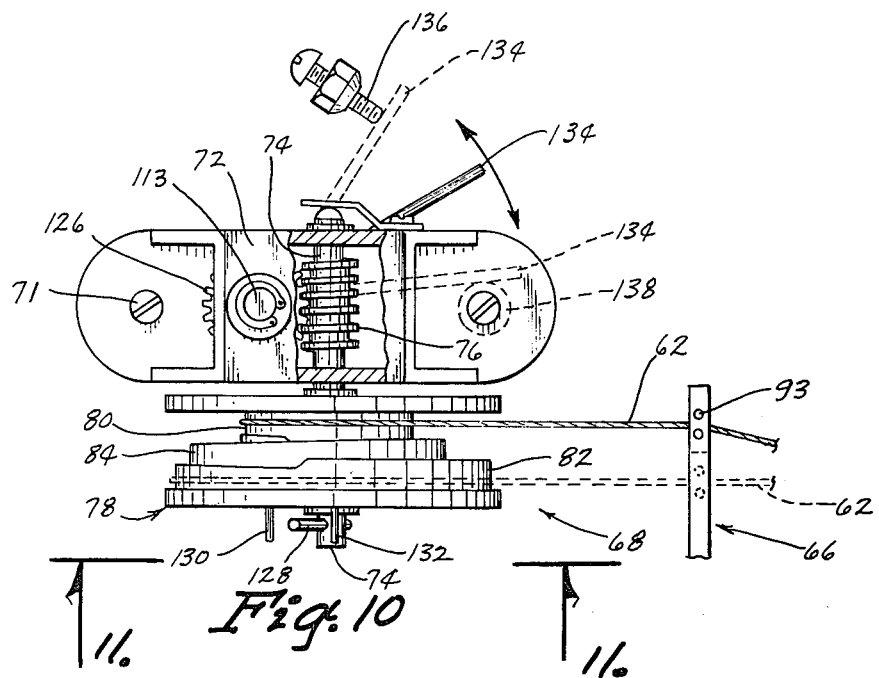
FIG. 10 is a partial bottom elevational view of the clutch mechanism of the invention with portions thereof broken away to more fully illustrate the invention.
Figure 11:
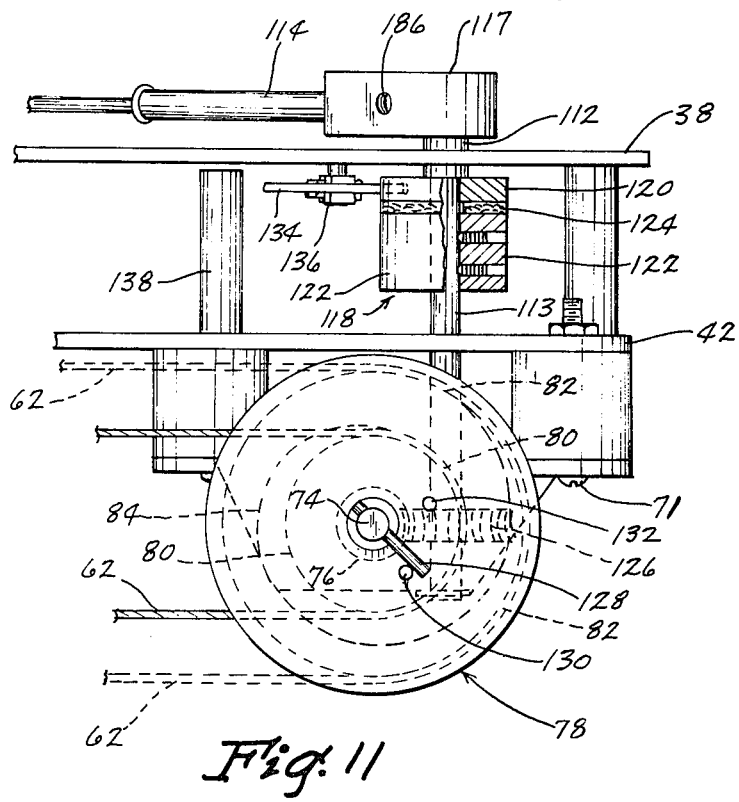
FIG. 11 is a sectional view seen on lines 11—11 of FIG. 10.

Probe line 62 extends from drum 60 through a shifting mechanism 66, around drum 78, through shifting mechanism 66, and thence downwardly around pulley 70. Drum 78 is secured to support 42 by means of screws 71 extending upwardly from frame 72 into support 42. Drum 78 includes a shaft 74 which is rotatably mounted in frame 72 and which has a worm gear 76 provided thereon. Drum 78 is rotatably mounted on shaft 74 and includes a small diameter drum portion 80, large diameter drum portion 82, and a spiral or helix-shaped ramp portion 84 extending therebetween. In FIGS. 4, 10 and 11, it can be seen that probe line 62 extends around drum portion 80. FIGS. 10 and 11 illustrate the probe line 62 (broken lines) as extending around drum portion 82 which is also shown by broken lines.

Figure 9:
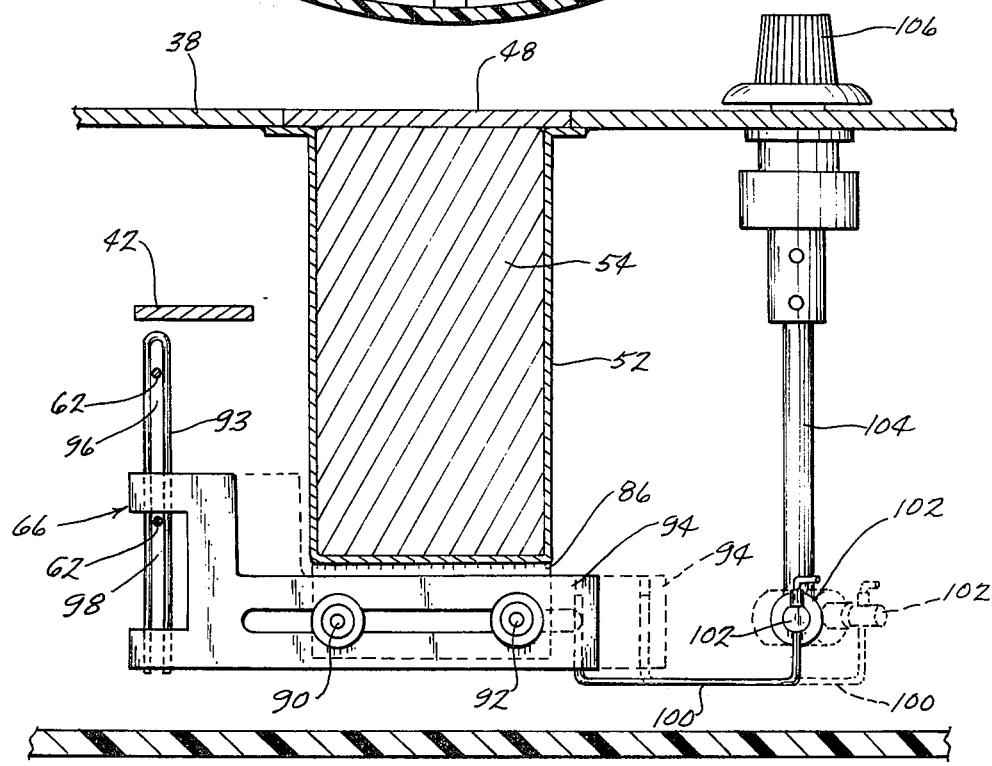
FIG. 9 is a sectional view seen on lines 9—9 of FIG. 8.

Shifting mechanism 66 comprises a bracket 86 secured to the bottom of battery housing 52 by screws 88 and having bolts or pins 90 and 92 extending therefrom. Shifting mechanism 66 also comprises a slide 94 which is slidably mounted on bolts 90 and 92 as illustrated in FIG. 9. An inverted U-shaped guide 93 is mounted on one end of slide 94 and it can be seen in FIG. 9 that the probe line 62 extends therethrough at 96 and 98. Arm 100 is secured to and extends between the other end of slide 94 and a finger 102 which extends laterally from the lower end of shaft 104. Shaft 104 is rotatably mounted in plate 38 and has a range indicator knob 106 mounted on the upper end thereof. As seen in FIG. 3, the knob 106 may be rotated between 108 (0 to 12 inches) and 110 (0 to 24 inches). Thus, rotation of knob 106 from 108 to 110 causes shifting mechanism 66 to move the probe line 62 from small drum portion 80 to large drum portion 82 since the line 66 is moved laterally with respect to drum 78 by the shifting mechanism. Rotation of the knob 106 also activates an electrical switch means which is referred to generally by the reference numeral 111 in FIG. 12.

Stylus support shaft 112 rotatably extends downwardly through plate 38 as illustrated in FIG. 11. Stylus arm 114 is secured to the upper end of shaft 112 and supports a conventional stylus needle or pen 116 which is adapted to operate in conventional fashion. The numeral 118 refers generally to a clutch including a clutch plate 120 which is secured to the lower end of shaft 112 and a clutch plate 122 which is secured to the upper end of shaft 113. A friction disc or material 124 is imposed between the clutch members 120 and 122 to provide the necessary frictional engagement between the clutch members. Gear 126 is mounted on the lower end of shaft 113 so as to mesh with the worm gear 76. Finger 128 is secured to one end of shaft 74 and is adapted to engage the spaced apart pins 130 and 132 which are secured to and which extend outwardly from drum 78. Thus, drum 78 will not rotate shaft 74 until finger 128 engages either pin 130 or pin 132.

Arm 134 is secured to clutch plate 120 and extends horizontally outwardly therefrom. Arm 134 is adapted to engage adjustable stop 136 which is secured to and which is positioned below plate 38 (FIG. 11). Arm 134 engages stop 136 to limit the rotational movement of shaft 112 in one direction. Arm 134 is also adapted to engage post 138 to limit the rotational movement of shaft 112 in the opposite direction. Stop 136 and post 138 aid in preventing the sytlus needle or pen 116 from leaving the inner and outer edges of the recording sheet 140.

The numeral 142 refers to a conventional clock device having a drive shaft 144 extending upwardly therefrom through plate 38. A recording sheet locking device 146 is pivotally secured to the upper end of drive shaft 144 for maintaining the sheet 140 in the proper position. The clock device 142 may be switched between 24 hour or 7 day positions by means of switch 148 in conventional fashion. The clock device 146 may also be conventionally wound at 150. As seen in FIG. 3, the recording sheet 140 is conventional except that indicia for 0 to 12 inch pipes and 0 to 24 inch pipes is provided and which is referred to generally by the reference numerals 147 and 149 respectively.

As previously stated, probe line 62 extends over pulley 70 which is mounted on shaft 152 which rotatably extends through plates 154 and 156 which extend downwardly from support 42. Probe line 62 has an electrical insulative coating or jacket thereon. One end of shaft 152 is supported by a normally open slack switch 158 while the other end of shaft 152 is supported by a normally closed "up-limit" switch 160. Probe line 62 extends downwardly through the opening 162 in bottom 164 of housing 32. The numeral 166 refers to an electrically conductive probe secured to the lower end of probe line 62. A limit plate 168 is provided on probe 66 and is adapted to engage the underside of housing member 32 to limit the upper movement of line 62.

Figure 12:
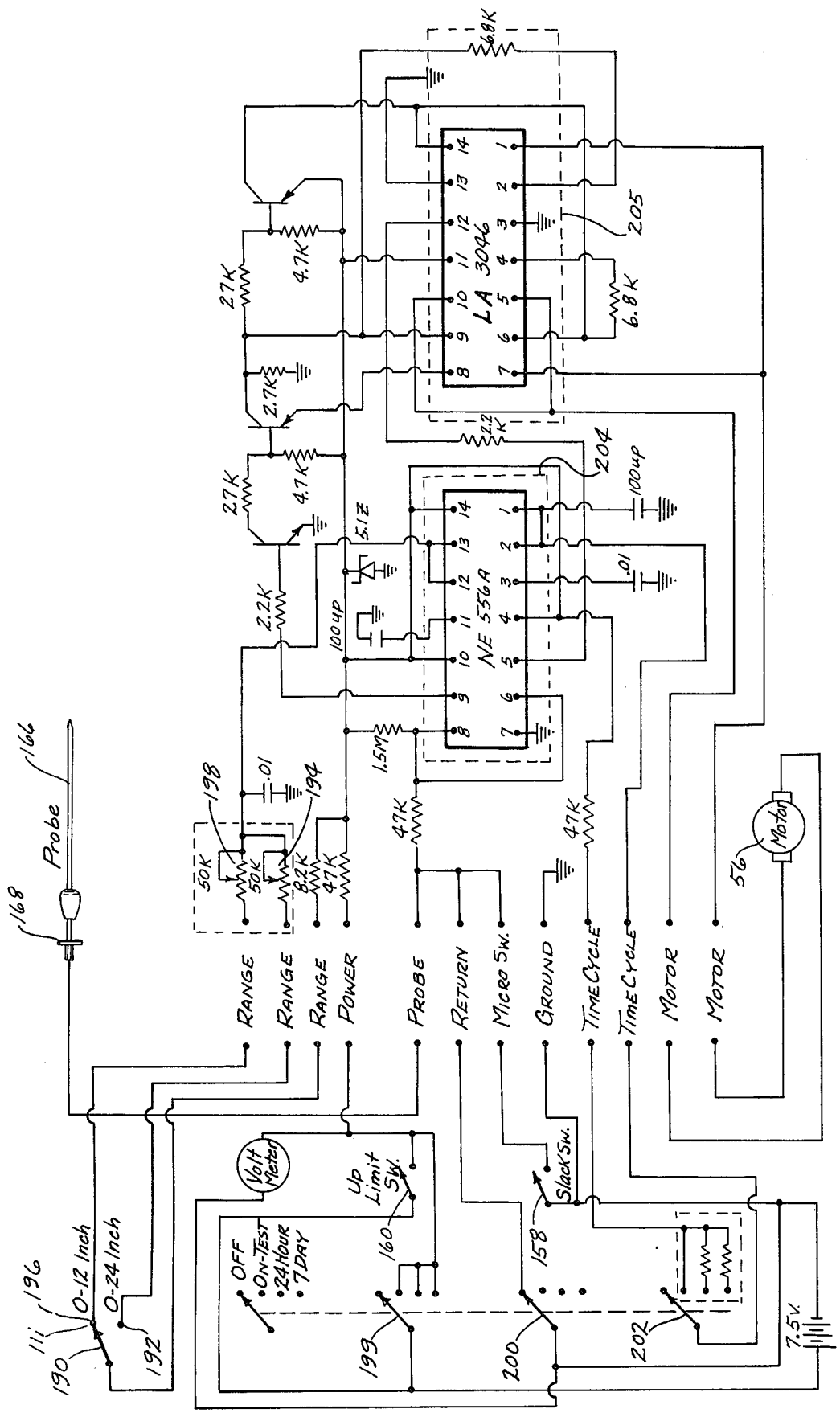
FIG. 12 is a schematic of the electrical circuitry of the invention.

As illustrated in the drawings, the device is also provided with a "function" switch 170 which is operatively connected to the electrical circuit seen in FIG. 12 to permit the circuit to be switched between functions of 7 day (172), 24 hour (174), on-test (176) and off-retract (178). A voltmeter 180 is also provided on plate 38 to permit the operator to monitor the charge condition of the battery. If the cover 34 is not comprised of a transparent material, the cover 34 should have transparent areas 182 and 184 provided therein to permit monitoring of the recording chart and voltmeter respectively.

To place the device in operation, the cover 34 is removed and the clock device 142 is wound in conventional fashion. The clock device 142 is then switched to either a 24 hour cycle or a 7 day cycle by means of switch 148 in conventional fashion. The position of the stylus pen 116 may be accurately positioned by means of an adjustment screw 186 which threadably extends through the clamp portion 117 to clamp the clamp portion 117 onto the shaft 112. The adjustment screw 186 permits the arm 114 to be length adjustable and also permits the amount of pressure applied to the stylus pen 116 to be selectively varied.

If the pipe 22 has a diameter of 0 to 24 inches, the range knob 106 is rotated to 110 which causes the shifting mechanism 66 to urge the probe line 62 into position on the small drum portion 80 as previously described. The rotation of the knob 106 to position 110 also causes switch 111 to be actuated so that the switch arm 190 closes upon contact 192. Rotation of the knob 106 as previously described causes the circuit to be completed through the switch 111 to the potentiometer 194. If the knob 106 is switched to position 108, switch arm 190 moves into electrical engagement with contact 196 which causes the circuit to be completed through the potentiometer 198. The switching of the switch 111 simply permits the withdrawal time of the probe 166 to be adjusted corresponding to the diameter of the sewer pipe. In other words, the difference in the diameters between drum portions 80 and 82 requires that the motor 56 be reversed for different periods of time to move the probe 166 a sufficient distance above the liquid level. If the knob 106 is rotated to position 108 as described, the shifting mechanism 66 is also moved so as to urge the probe line 62 onto the large diameter drum portion 82. The probe line will not move from the small drum portion 80 onto the large drum portion 82 until the drum 78 has been rotated so that the probe line 62 can move along the ramp 84 onto the large drum portion 82. The voltmeter 180 reads in all positions except when switch 170 is in the off-retract position.

The device 10 would be installed in the man-hole as illustrated in FIG. 2 by extending the members 14 and 16 into engagement with the walls thereof.

After the unit 10 has been placed in the man-hole and the probe has descended and is properly cycling off the surface of the liquid, the pen or stylus is then adjusted or positioned. The recording chart 140 is then placed on the device, if not previously done so, in conventional fashion and then selectively rotated until the proper time "depth" is positioned below the stylus pen 116. Locking device 146 is then utilized to maintain the recording sheet 140 in position so that it will rotate with shaft 113. The device may be calibrated by making a manual measurement of the liquid level in the man-hole 19. For example, if the liquid level in man-hole 19 was determined to be eight inches, arm 114 would be grasped by the operator and moved into position so that the stylus pen 116 was positioned over that portion of the chart 140 which represented 8 inches. The shaft 112 may be rotated relative to the shaft 113 for calibration purposes by means of the clutch 118. As previously stated, the arm 134 is adapted to engage the adjustable stop 136 and post 138 to prevent the stylus pen from leaving the inner and outer peripheries of the recording chart respectively.

Knob 170 would then be rotated to either position 174 or position 172 depending upon the position of the switch 148. Position 176 is simply a fast cycle rate to permit the operator to observe several cycles before switching to a slower rate. Rotation of the knob 170 to either positions 172 or 174 also causes the switches 199, 200 and 202 to close upon the proper contact so that the motor 56 is energized through the control integrated circuit 204 so that the probe line 62 is extended downwardly from the housing 12. The control integrated circuit 204 (FIG. 12) includes the dual timer circuitry which controls the probe withdrawal time and the periods between sampling. The length of the withdrawal time is determined by potentiometer 198 or potentiometer 194. The control integrated circuit 205 serves to reverse the polarity of the motor 56. The motor 56 continues to lower the probe line 62 until the probe 166 contacts the liquid thereby grounding the circuit which causes the motor 56 to reverse to raise the probe 166 a predetermined distance above the liquid level for a predetermined length of time. The motor 56, at predetermined intervals, lowers the probe 166 until contact with the liquid is achieved. Thus, the electrical circuitry and the motor 56 permits the periodic sensing of the liquid level. The probe 166 is maintained above the liquid level between the periods of sampling or sensing the level of the liquid so that debris in the water will not adversely affect the sampling and so that the probe 166 will not be damaged. The lowermost position of the probe 166 is recorded on the chart 140 due to the connection of the shaft 74, which supports drum 78, through shaft 113. As probe 166 is lowered by the motor 56, pin 130 engages finger 128 to cause the rotation of shaft 74 which in turn causes shaft 113 to be rotated so that the liquid level will be recorded on the recording chart. Upon the motor 56 being reversed to raise the probe 166 a predetermined amount (timed) above the liquid, drum 78 is permitted to turn an amount equal to the distance between pins 130 and 132. Thus, the upward movement of the probe 166 relative to an increase in liquid level on a succeeding cycle will be reflected on the recording chart.

In the event that there is not any liquid in the sewer pipe, the probe 166 will engage the bottom of the pipe and will tend to pivot or deflect laterally as illustrated by solid lines in FIG. 7 since the circuit is not completed through the probe 166 by way of the probe line 62. The normal weight of the probe 166 normally maintains the switch 158 in its normally open position. In the event that the probe 166 engages the bottom of the sewer pipe as illustrated in FIG. 7, the probe line 62 becomes slack so that the weight is removed from the switch arm 206 thereby causing the switch 158 to close which causes the motor 56 to reverse itself so that probe line 62 is moved upwardly from the sewer pipe. Without the slack switch 158, the probe line 62 would continue to play out and would possibly become hopelessly entangled within the serer pipe.

The probe 166 is raised upwardly from the sewer pipe upon the switch 158 becoming closed until the weight of the probe opens switch 158 and the timed ascent is complete. This cycle continues until fluid returns to the sewer pipe or function selector is placed in position 178. When switch knob 170 is placed in position 178, probe 166 is raised until element 168 engages the bottom 164 of housing member 32. Continued actuation of the motor 56 causes the pulley 70 to be urged downwardly so that the normally closed switch 160 is opened so that the system is deactivated when the probe line is fully retracted.

Thus it can be seen that a novel liquid level indicator and flow measuring device has been provided which has a two range measuring drum which is switched mechanically and electrically by means of a knob on the device to give the unit a 0 to 12 inch and a 0 to 24 inch range. The ability to switch the device as described results in a better definition being provided on the scale or recording chart. It can also be seen that a device has been provided wherein the liquid level is periodically sensed and recorded with the probe being out of engagement with the liquid between sampling times so as to achieve more accurate measurements and to prevent damage to the probe. The device also has improved means for deactivating the system upon the probe line becoming fully retracted. As previously described, the unit has three sample cycle rates. The function switch may be moved to position 176 to test and to determine the proper operation. Positions 174 and 172 are slower cycle rates to coincide with the 24 hour time period and the 7-day time period which permits greater battery life. The construction of the cover 34 is such that the voltmeter and recording chart can be observed without removing the cover therefrom.

Thus it can be seen that the liquid level indicator and flow measuring device of this invention accomplishes at least all of its stated objectives.

I claim:
1. In a liquid level indicating means comprising,
    a housing adapted to be positioned above a body of water having an upper surface,
    a movable probe line having a probe on the lower end thereof extending downwardly from said housing, said probe line and said probe being electrically conductive,
    control means in said housing for intermittently lowering and raising said probe line so that said probe is intermittently moved into and out of engagement with the upper surface of said liquid, said control means including a reversible power means secured to said probe line, a timing means, and a control circuit interconnecting said power means and said timing means, first means in said control circuit connected to said probe line, said probe and said power means and being electrically responsive to engagement of said probe to the upper surface of said liquid to cause said power means to reverse itself to raise said probe line upon contact of said probe with the upper surface of said liquid, second means in said control circuit to stop the upward movement of said probe line, said timing means being operatively connected to said power means to effect the lowering of said probe line by said power means after a predetermined length of time, a recording chart means in said housing, a recording means operatively connected to said probe line which is responsive to the downward movement of said probe line into engagement with said liquid so that the level of said liquid is recorded on said recording chart means.

2. The device of claim 1 wherein said control means includes a normally open switch means operatively connected to said probe line which is closed to reverse said motor, to cause said probe line to be raised, when a predetermined amount of slack is present in said probe line as said probe line is lowered.

3. The device of claim 1 wherein said control means includes a normally closed switch means operatively connected to said probe line which is opened to deactivate said motor when a predetermined amount of tension is present in said probe line as said probe line is raised.

4. The device of claim 1 wherein clutch means is connected to said recording means and said probe line so that the range of variation of the level of said liquid measured by said probe line and recorded by said recording means can be selectively changed.

5. The device of claim 1 wherein said control means includes a lost motion mechanism which permits said probe line to be raised and lowered with respect to a liquid level of constant value without operating said recording means.

6. The device of claim 1 wherein means is connected to said timing mechanism to adjust said predetermined amount of time.

7. In a liquid level indicating means comprising, a housing adapted to be positioned above a body of water, a movable probe line extending downwardly from said housing, said probe line being electrically conductive, control means in said housing for intermittently lowering and raising said probe line so that said probe is intermittently moved into and out of engagement with the upper surface of said liquid, said control means including a reversible power means secured to said probe line, a timing means, and a control circuit interconnecting said power means and said timing means, first means in said control circuit connected to said probe line, said probe and said power means and being electrically responsive to engagement of said probe to the upper surface of said liquid to cause said power means to reverse itself to raise said probe line upon contact of said probe with the upper surface of said liquid, second means in said control circuit to stop the upward movement of said probe line, said timing means being operatively connected to said power means to effect the lowering of said probe line by said power means after a predetermined length of time, a recording chart means in said housing, a recording means operatively connected to said probe line which is responsive to the downward movement of said probe line into engagement with said liquid so that the level of said liquid is recorded on said recording chart means, said power means comprising a reversible electric motor means having a first rotatable drum secured thereto, said probe line being normally wound upon said first drum, a clutch means in said housing including a drum having a large diameter drum portion and a small diameter drum portion, said probe line extending from said first drum around one of said large and small drum portions, a pulley rotatably mounted in said housing, said probe line extending from said drum around said pulley and thence downwardly from said housing, and said drum being operatively connected to said recording means.

8. The device of claim 7 wherein a mechanical shifting mechanism is mounted in said housing for moving said probe line between said large and small diameter drum portions.

9. The device of claim 7 wherein said clutch includes a rotatable shaft, said clutch drum being mounted on said shaft, said rotatable shaft being operatively connected to said recording means.

10. The device of claim 9 wherein said clutch drum is mounted on said rotatable shaft so that said drum is rotated by said probe line a predetermined amount before said shaft is rotated.

11. The device of claim 7 wherein said clutch means includes stop means for limiting the movement of said recording means relative to the inner and outer peripheries of said recording chart.

12. The device of claim 7 wherein said control means includes a normally open switch means operatively connected to said pulley which is closed to reverse said motor when a predetermined amount of slack is present in said probe line as said probe line is lowered.

13. The device of claim 7 wherein said control means includes a normally closed switch means which is operatively connected to said pulley which is opened to deactivate the motor when a predetermined amount of tension is present in said probe line as said probe line is being raised.

* * * * *